(12) United States Patent
Lacour (10) Patent No.: US 8,465,303 B2
(45) Date of Patent: Jun. 18, 2013

(54) ELECTRICAL COUPLING SYSTEM FOR AN ELECTRICAL CHARGING DEVICE

(75) Inventor: Gilles Lacour, Belley (FR)

(73) Assignee: Delachaux S.A. (FR)

( * ) Notice: Subject to any disclaimer, the term of this patent is extended or adjusted under 35 U.S.C. 154(b) by 25 days.

(21) Appl. No.: 13/141,571

(22) PCT Filed: Dec. 22, 2009

(86) PCT No.: PCT/EP2009/067799
§ 371 (c)(1),
(2), (4) Date: Jun. 22, 2011

(87) PCT Pub. No.: WO2010/072785
PCT Pub. Date: Jul. 1, 2010

(65) Prior Publication Data
US 2011/0256737 A1    Oct. 20, 2011

(30) Foreign Application Priority Data

Dec. 22, 2008  (FR) ..................................... 08 58929

(51) Int. Cl.
*H01R 13/60* (2006.01)
(52) U.S. Cl.
USPC .......................................... 439/131; 320/106
(58) Field of Classification Search
USPC ............................ 320/106–108; 439/131–137
See application file for complete search history.

(56) References Cited

U.S. PATENT DOCUMENTS

RE29,994 E    5/1979  Bossi
5,821,731 A * 10/1998 Kuki et al. .................... 320/108

FOREIGN PATENT DOCUMENTS

| DE | 2519976 A1 | 11/1976 |
| DE | 10313698 A1 | 5/2005 |
| EP | 1167112 A1 | 1/2002 |
| EP | 2039557 A1 | 3/2009 |
| FR | 2696985 A1 | 4/1994 |
| GB | 2185866 A | 7/1987 |
| JP | 62-230303 A | 10/1987 |
| JP | 63-234803 A | 9/1988 |
| JP | 2004-136860 A | 5/2004 |
| SU | 1206138 A1 | 1/1986 |

OTHER PUBLICATIONS

International Search Report, PCT/EP2009/067799, dated Nov. 16, 2010.
International Search Report, PCT/EP2009/067800, dated Nov. 19 2010.

* cited by examiner

*Primary Examiner* — Renee Luebke
*Assistant Examiner* — Larisa Tsukerman
(74) *Attorney, Agent, or Firm* — Lerner, David, Littenberg, Krumholz & Mentlik, LLP (57) ABSTRACT

The invention relates to an electrical coupling system for an electrical charging device having energy storage means of an electrically driven motor vehicle, characterized in that it comprises a support that can be plugged into a recess made in the floor, at least two electrically conducting plates in the support, the plates being electrically connected to the charging device, movement means, capable of moving the plates between a retracted position and an exposed position on the ground, and at least one protective element intended to cover the recess in which the plug-in support is housed when the plates have been retracted.

24 Claims, 10 Drawing Sheets

ELECTRICAL COUPLING SYSTEM FOR AN ELECTRICAL CHARGING DEVICE

CROSS REFERENCE TO RELATED APPLICATIONS

The present application is a national phase entry under 35 USC §371 of International Application No. PCT/EP2009/067799, filed Dec. 22, 2009, which claims the benefit of and priority to French Patent Application No. 0858929, filed Dec. 22, 2008, the entire disclosures of which are incorporated herein by reference.

TECHNICAL FIELD

The present invention concerns the technical field of devices which can be used to charge/recharge electric energy storage means of a vehicle comprising an electric motor.

STATE OF THE PRIOR ART

Devices have already been developed allowing the recharging of energy storage means of a vehicle with electric drive.

One approach comprises equipping the vehicle with a power cord comprising a connector at one free end capable of cooperating with a mating connector connected to an external electric energy source. As a variant, the power cord is connected to the electric source and connects onto a connector provided on the vehicle. However, this requires the user to get out of the vehicle to connect the electric energy source manually to the storage means by means of the cord. This is tedious and involves a risk of electrocution in the event of improper handling.

To overcome this disadvantage, an automatic charging device is known from document U.S. Pat. No. 6,265,261 intended for an electric vehicle. This charging device can be used on a rail arranged on the ground and connected to an electric energy source. To ensure precise positioning of the vehicle relative to the rail, the device on the vehicle side comprises an element of upturned U-shape whose side walls are intended to come to position themselves either side of the rail so that the element of upturned U-shape caps the rail. However, one disadvantage of this charging device is that it requires precise positioning of the vehicle relative to the rail, to allow contacting of the rail with the element of upturned U-shape.

A charging device is also known from U.S. Pat. No. 541,298 using alignment data of the vehicle relative to the electric energy source, to allow precise docking of the vehicle with this energy source. Here again, the charging device requires precise positioning of the vehicle relative to the electric energy source.

To overcome these shortcomings, U.S. Pat. No. 5,523,666 proposes an electric energy charging device comprising a contact element on the vehicle side intended to come into contact with a mating element arranged on the electric energy source. An emitter on the vehicle side allows transmission to the energy source of data concerning the instantaneous height position of the vehicle's contact element. Height adjustment means allow the height of the mating element on the energy source to be adjusted in relation to this data on the height of the contact element. This allows automatic adapting of the heights of the contact element and of the mating element. However, one disadvantage of this charging device is that it only allows tolerance with respect to the height positioning of the vehicle.

To overcome these constraints regarding vehicle positioning U.S. Pat. No. 5,431,264 proposes an electric energy charging system using induction. However, this type of charging system with an inductive coil has numerous drawbacks. In particular, a powerful electromagnetic field is generated to allow recharging of the vehicle. Said electromagnetic field may be harmful for the physical integrity of the user or of other persons in the vicinity of the magnetic field.

It is one objective of the present invention to propose a device for automatic recharging of electric energy storage means, with which it is possible to remedy the above-mentioned disadvantages.

A further objective of the present invention is to propose a safe and more robust charging device than the prior art devices.

SUMMARY OF THE INVENTION

For this purpose, an electric coupling system is proposed to couple an electrical charging device with energy storage means of an electric drive vehicle, noteworthy in that it comprises a support which can be positioned in a recess made in the ground, at least two electrically conductive plates in the support, the plates able to be electrically connected to a charging device, shifting means capable of shifting the plates between a retracted position and a position released from the ground, and at least one protection element intended to cover the recess in which the support is positioned when the plates are retracted.

The proposed solution has numerous advantages. In particular, it can be set up in environments in which the aerial cable solution is not adapted, as in covered spaces for example. It also allows the recharging of vehicles of any height. In addition, the proposed solution provides large tolerance regarding the positioning of the vehicle relative to the electric contacts positioned on the ground.

Preferred, but non-limiting aspects of the system according to the invention are the following:
  the system further comprises mobile side protection panels arranged to prevent the falling of objects into the support, the movements of the protection element and of the mobile side protection panels being synchronous;
  the means driving each plate comprise at least one linear actuator comprising a fixed part and a mobile part,
  the mobile side protection panels are connected to the protection element via rods,
  the protection element is connected to the mobile part of the actuator via rods,
  the protection element is pivot-mounted on the mobile side protection panels,
  the system further comprises elastic means between the protection element and the mobile side protection panels, said elastic means exerting a force on a partition of the protection element which tends to move the protection element away from the plate,
  the mobile side protection panels are secured to the end of the mobile part of the actuator,
  the protection element is pivot-mounted on the mobile part of the actuator,
  the plates are elongate and their major axes lie parallel to each other,
  the plates are offset laterally from each other,
  the major axes C-C' of the plates merge,
  the plates are mobile by pivoting at least about a horizontal axis A-A', B-B',
  the system further comprises means for detecting the presence of a vehicle above the plates.

The invention also concerns an installation for recharging electric drive vehicles, noteworthy in that it comprises a vehicle parking space provided with a plurality of coupling systems having the above characteristics.

BRIEF DESCRIPTION OF THE FIGURES

Other characteristics, purposes and advantages of the present invention will become further apparent from the following description which is solely illustrative and non-limiting, and is to be read with reference to the appended drawings in which:

FIG. 2b is a more detailed schematic illustration of the coupling means illustrated FIG. 2a;

FIGS. 3a, 3b, 3'a to 3'c, 4a to 4d, 4'a, 4'b and 5a, 5b, 5c are schematic illustrations of portions of the connection system according to the invention;

FIGS. 6 to 9 are schematic illustrations of different embodiments of the coupling system according to the invention;

FIGS. 10a to 10c are schematic illustrations of various variants of embodiment of the charging device according to the invention;

FIGS. 11a and 11b are overhead views of two examples of embodiment of the coupling system according to the invention;

DETAILED DESCRIPTION OF PREFERRED EMBODIMENTS OF THE INVENTION

A more detailed description of the invention will now be given with reference to FIGS. 1 to 17 which are schematic illustrations of different embodiments of the invention.

General Principle of the Invention

Figure 1:
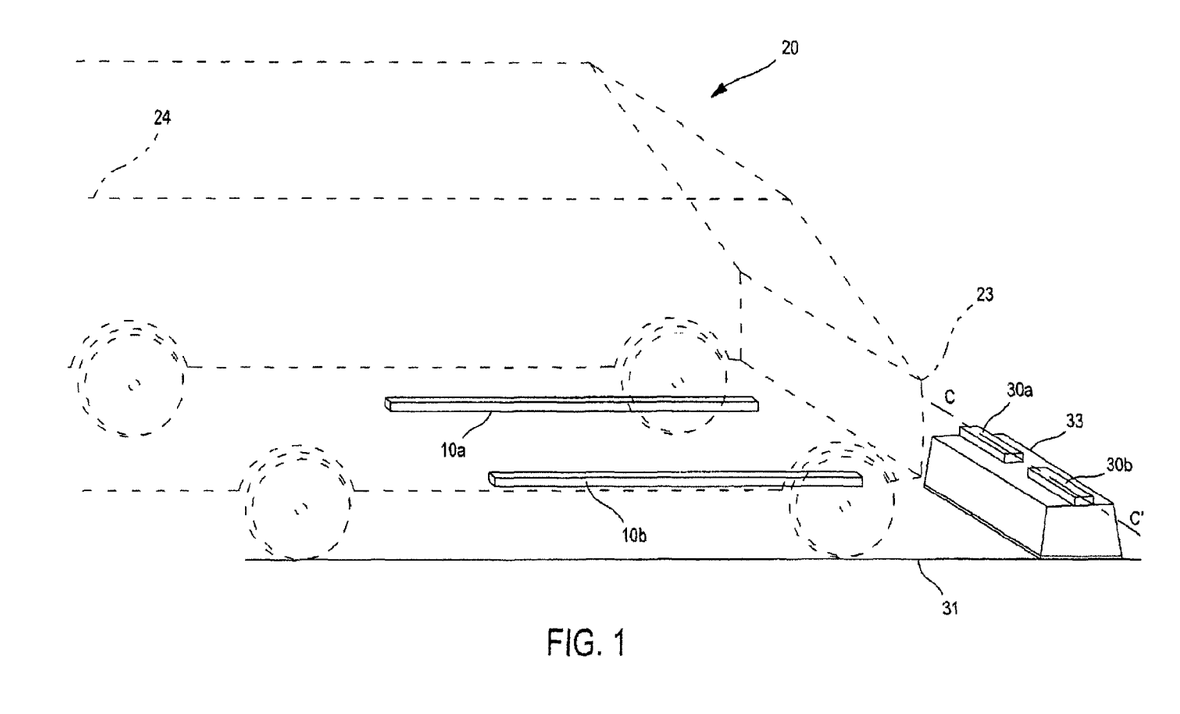
FIG. 1 is a perspective, schematic illustration of a connection assembly according to the invention.

With reference to FIG. 1, one embodiment of the electric connection assembly of the invention is illustrated for charging the energy storage means of an electric drive vehicle 2.

The electric connection assembly comprises:
an electric connection system on the vehicle side, and
a coupling system at ground level to which the vehicle can be taken.

In the embodiment illustrated FIG. 1, the electric connection system comprises two electrically conductive bars 10a, 10b extending underneath the vehicle close to the ground between the front 23 and rear 24 regions of the vehicle. The electrically conductive bars extend parallel to a longitudinal axis of the vehicle. These electrically conductive bars are electrically connected to respective terminals of the vehicle's electric energy storage means (not illustrated) such as lithium-ion batteries, super-capacitors or a combination of both.

The coupling system comprises two electrically conductive contact plates 30a, 30b. These electrically conductive plates 30a, 30b are arranged on the ground 31. More precisely, the plates 30a, 30b in the present example are mounted on an electrically insulating block 33 projecting upwards from the ground 31. As a variant, each plate could be mounted on its own block. The plates 30a, 30b are electrically connected to a charging device for electrically charging the energy storage means of the vehicle. Here they have major axes which extend along one same direction C-C' generally transverse to the direction of travel of the vehicle.

The general operating principle of the connection assembly according to the invention is the following:

To charge and/or recharge the vehicle, it is moved so that it is positioned above the electrically conductive plates 30a, 30b.

Advantageously, the upper surface of the plates 30a, 30b lies above the ground at a vertical distance from the ground that is greater than the vertical distance between the lower surface of the bars of the connection system and the ground when the vehicle is not in connected position.

When the vehicle is positioned above the block 33, the bars 10a, 10b come into contact with the electrically conductive plates 30a, 30b. In the present example, the vehicle is frame-suspended and has variable ground clearance, and it is the consequent possible variation in its ride attitude that allows compensation for the difference in height between the lower surfaces of the bars 10a, 10b and the upper surfaces of the plates 30a, 30b.

Once the lower surfaces of the bars 10a, 10b are in contact with the upper surfaces of the plates 30a, 30b, the vehicle is immobilized. The charging device is then in electric contact with the vehicle's storage means via the connection assembly of the invention. The charging device is then set in operation to allow the charging/recharging of the vehicle's storage means.

One of the advantages of the above-described connection assembly is that it provides large tolerance regarding the positioning of the vehicle relative to the electric contacts positioned on the ground, both with respect to length and width by means of the dimensions and orientations of the bars and plates, and with respect to height by means of the variations in vehicle ride attitude.

A more detailed description will now be given of different embodiments of the connection assembly according to the invention.

Connection System

Figure 2A:
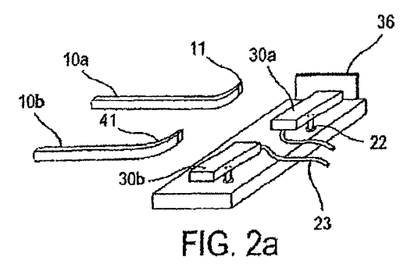
FIG. 2a is a perspective schematic illustration of one embodiment of the connection system and of the coupling system according to the invention.

With reference to FIG. 2 a variant of embodiment is shown of the connection system according to the invention. In this variant, each electrically conductive bar comprises a spatula 11, 41 at one (or both) its ends.

These spatulas 11, 41 facilitate the passing of the bars 10a, 10b over the plates 30a, 30b when the vehicle is moved to bring the bars above the plates. Therefore, if a height is chosen (relative to the ground) of the upper surface of the plates 30a, 30b that is slightly greater than the distance between the lower surface of the bars 10a, 10b and the ground, then the spatulas are able progressively to create an increase in the vehicle's attitude to achieve easy self-adaptation of height.

According to one variant of embodiment, not illustrated, provision may be made for the bars 10a, 10b to be mounted so that they can be moved on the underside of the vehicle (for example by means of a servomotor, compensation springs, etc) so as to cancel out differences in height between the upper surface of the plates 30a, 30b and the lower surface of the bars 10a, 10b.

Figure 3:
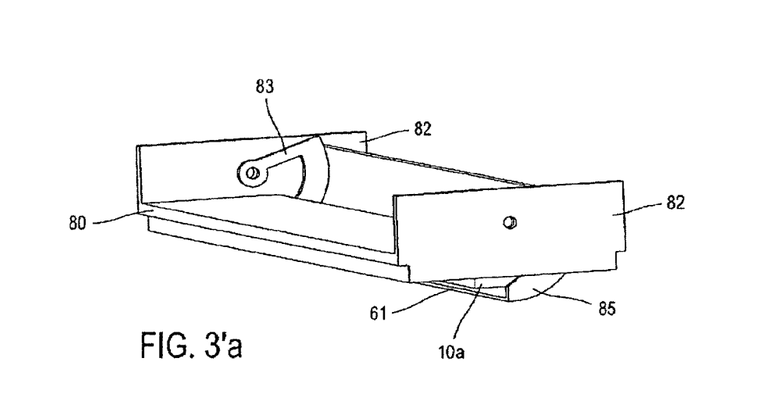
Figure 3A:
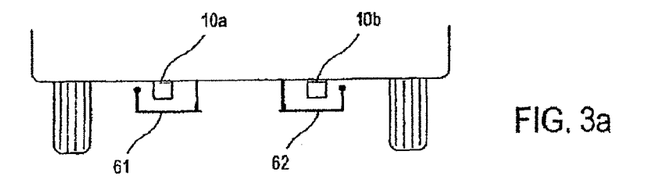
Figure 3B:
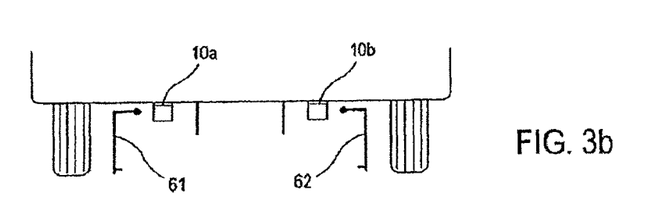

FIGS. 3a, 3b, and 3'a to 3'c illustrate other embodiments of the connection system according to the invention.

In these embodiments, the connection system comprises protection means to block access to the electrically conductive bars and to protect the same (from impacts, dirt, accidental electric contact, etc.) when they are not in use.

In these different embodiments, the protection means can be moved relative to the vehicle chassis. This allows simplification of the connection between the storage means and the bar. In particular, it is not necessary for the connection cables between the energy storage means and the bar to be flexible, unlike the case when it is the bar which can be moved relative to the vehicle chassis.

The protection means to block access to the electrically conductive bars may comprise at least one cover.

In the embodiments illustrated FIGS. 3a, 3b and 3'a, 3'b the protection means comprise two covers 61, 62 each associated with a bar 10a, 10b. In another embodiment, each bar is associated with two covers 61. Each cover can be moved between an open position and a closed position by pivoting about a pivot axis parallel to the longitudinal axis of the associated bar positioned in the vicinity thereof.

The movement of the cover(s) is ensured by drive means which may be of any type known to persons skilled in the art, such as a motor directly connected on the pivot axis of the cover or a motorized bearing.

In the embodiment illustrated FIGS. 3a and 3b the pivot axis of each cover is positioned between the bar and a side face of the vehicle.

When the vehicle is not being charged, each cover 61, 62 is in closed position so as to cover its associated bar as illustrated FIG. 3a.

When the vehicle is charging, each cover is in the open position so as to form a skirt which extends from the car bodywork towards the ground to limit risks of access to the conductive bar and associated plate, as illustrated FIG. 3b.

This allows the limiting of risks of undue contact with the plates or the bars when in use.

If the vehicle comprises a single bar comprising two electrically conductive segments, the protection means can also comprise two covers whose pivot axes are located either side of the bar so as to cover the bar when the vehicle is not being charged and to form a skirt when the vehicle is charging.

With reference to FIGS. 3'a to 3'c the protection means comprise a housing 80 between the vehicle and the bar 10a. This housing is globally shaped as a rectangular parallelepiped and comprises two side walls 82 and a bottom part 86. The bottom part 86 of the housing comprises a slot 87 through which the cover 61 can pass. This housing 80 is intended to receive the cover(s) when they are in open position (vehicle's charging position).

In the embodiment illustrated FIGS. 3'a to 3'c the cover 61 extends longitudinally and is of curved shape along its longitudinal axis.

The bar 10a is attached to one face of the housing 80 facing the roadway via a flexible fastening 81 so as to allow angular play of the bar 10a along its longitudinal axis. The housing 80 is connected to the floor of the vehicle via its side walls 82 located at the ends of the bar 10a.

The cover 61 is fixed to the housing 80 via lugs 83 pivotally linked with the side walls 82 of the housing 80.

The lugs 83 may be connected onto the inner or outer faces of the side walls 82. If the lugs 83 are pivotally linked with the outer walls 82, slots are made in the side walls 82 to allow the cover 61 to pass between the open and closed positions.

Preferably the lugs 83 are pivotally linked with the inner faces of the side walls 82. This provides ensured sealing of the housing since it is then no longer necessary to make slots in the side walls 82 of the housing 80.

The bottom part 86 of the housing 80 also comprises L-shaped scrapers 84 arranged either side of the bar 10a. These scrapers 84 are arranged so that, in closed position, the cover 61 lies in the immediate vicinity—i.e. at a distance of between 0 and 1 centimeter—of the free end of each scraper 84. Each scraper 84 may be metallic. Each scraper, at its free end, may comprise a lip seal to ensure a seal between the scraper and the cover when the cover is in closed position.

The cover further comprises a skirt 85 on its side edges.

The scrapers 84, the side walls 82 of the housing 80 and the skirts 85 of the cover 61 ensure the sealing of the device when the cover is in closed position.

With reference to FIGS. 4a to 4d another embodiment is illustrated in which the bar can be moved relative to the chassis.

In the embodiment illustrated FIGS. 4a to 4d, each electrically conductive bar 10a or 10b is respectively fixed to a flat part of a support 12. The support 12 may be formed of an electrically insulating material. The cylindrical support may also be formed of an electrically conductive material and electrically insulated from the bar.

The support 12 extends along a longitudinal axis of the vehicle. The length of the cylindrical support 12 may be equal to or greater than the length of the bar 10a with which it is associated.

The support 12 is capable of pivoting about its longitudinal axis D-D' being subjected to drive means (not illustrated) able to be controlled. The drive means are a motor for example which can cause the cylindrical support to pivot between a released position and a retracted position.

Figure 4:
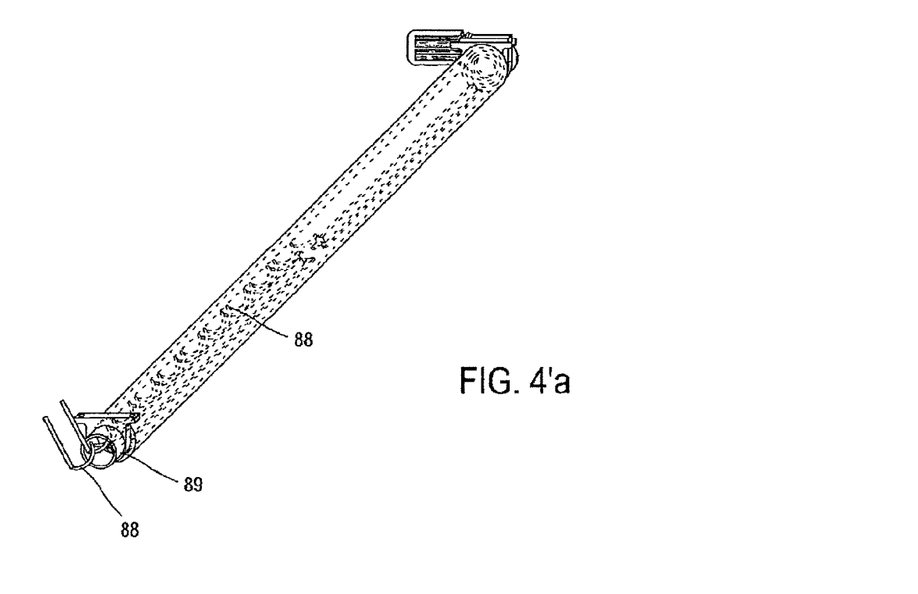
Figure 4A:
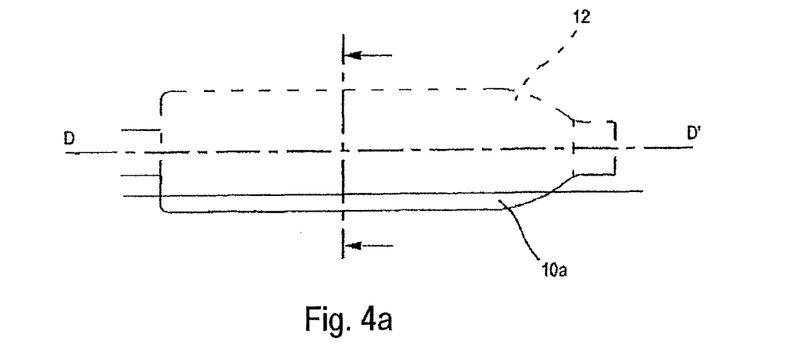
Figures 4B, 4C, 4D, 5A, 5B, 5C, 6:
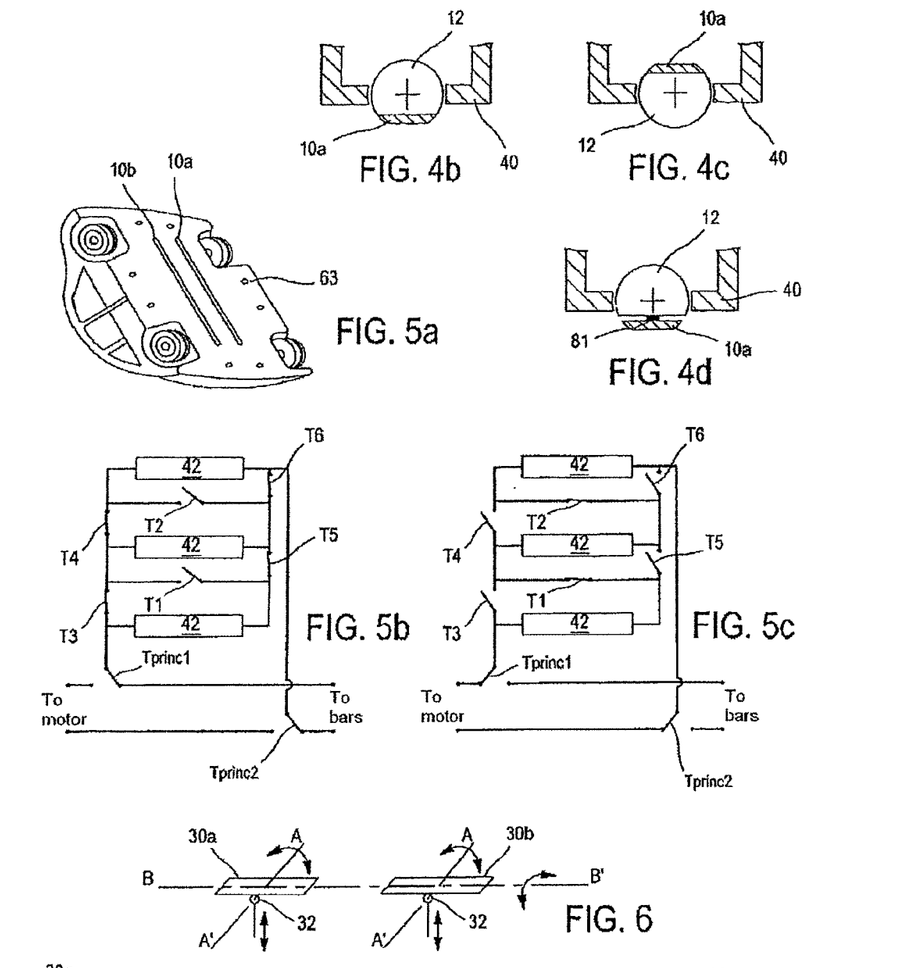

In the embodiment illustrated FIGS. 4a to 4c, the support 12 is cylindrical. This cylindrical support 12 is mounted in a framework 40 having a longitudinal opening into which the bar 10a or 10b extends substantially on its horizontal diametral plane.

In the released position illustrated FIG. 4b, the bar (here 10a) extends at the base of the support 12 and is able to come into contact with its respective plate (charging position).

In the retracted position illustrated FIG. 4c, the bar 10a is positioned at the upper part of the support 12 which has been rotated 180°. In this position, the cylindrical support 12 and the framework 40 contribute towards protecting the bar 10a against impacts, gravel and various projections (travelling position).

Evidently, the control means can cause the supports 12 associated with the bars 10a and 10b to pivot at suitable times.

Advantageously, the framework 40 may also be associated with a scraper arranged so as to allow cleaning of the electrically conductive bar 10a or 10b by friction on each pivoting of the support.

In the embodiment illustrated FIGS. 4a to 4d, the bars may be connected to the storage means using helical cables such as illustrated FIGS. 4'a and 4'b. This allows the providing of sufficient flexibility of the connection cables whilst limiting the space taken up by the device.

In the embodiment illustrated FIGS. 3'a to 3'c, each bar 10a is mounted with degrees of freedom by pivoting about two horizontal axes.

This can ensure the flat contacting of the lower surfaces of the bars with the upper surfaces of the plates when the bars are applied onto the plates, in particular to avoid electric arcs and/or overheating of the connection assembly when the current is passed, in particular if the current is conveyed at a simple edge or point contact region.

Different means may allow this angular play of the bars. For example, in one embodiment, each bar 10a is mounted on a swivel-joint to allow mobility by pivoting. In another embodiment, each bar 10a is mounted on a rubber block imparting sufficient mobility to ensure proper aligning of the upper and lower surfaces of the bar 10a and plate 30a at the time of contacting.

In the embodiment shown FIGS. 3'a to 3'c the angular play of the bar is ensured by the flexible fastening (e.g. in rubber) between the bar 10a and the bottom of the housing 80.

As a variant, the flexible fastening can be replaced by bearings 89 arranged at the ends of the bar 10*a* and defining an axis of angular pivoting of the bar, such as illustrated FIGS. 4'*a* and 4'*b*.

Advantageously, the means for ensuring angular play of the bar may be associated with abutments.

With reference to FIG. 3'*c*, an illustration of such abutments can be seen. More precisely, the bottom of the housing comprises electrically insulating abutments 87 extending longitudinally over the bottom part 86 of the housing 80. These abutments 87 can ensure electric insulation between the bar and the housing (and more generally the vehicle).

In another embodiment illustrated FIG. 5*a*, the connection system also comprises detection means 63 for detecting the intrusion and/or presence of a foreign body under the vehicle at the time of charging.

This allows the increased safety of the connection assembly according to the invention by providing against any possible risk of electrocution of a person at the time of charging.

The detection means 63 may comprise one or more volumetric, optic etc . . . sensors and/or one or more video cameras and/or one or more movement detectors.

These detection means 63 may be attached underneath the vehicle. The detection means 63 are connected to control means (not illustrated) which control the cut-off of the electric current if a foreign body is detected underneath the vehicle when it is being charged.

The connection system may also comprise switching means to connect the storage means 42:
- either to the bars 10*a*, 10*b* in a first position (charging position),
- or to the motor of the vehicle in a second position (travel position).

It will therefore be appreciated that in this embodiment, the storage means 42 are disconnected from the bars 10*a*, 10*b* in travel position to prevent risk of electrocution.

The switching means comprise two controlled switches for example $T_{princ1}$ and $T_{princ2}$ as illustrated FIGS. 5*b* and 5*c*. In charging position the controlled switches $T_{princ1}$, $T_{princ2}$ switch to the first position as illustrated FIG. 5*b*. In travel position, the controlled switches $T_{princ1}$, $T_{princ2}$ switch to the second position as illustrated FIG. 5*c*.

The connection system may also comprise switching means to obtain coupling in series or in parallel of the storage means 42. Coupling in parallel of the storage means 42 allows recharging thereof under safe low voltage (for example direct voltage of less than 60 volts) to guarantee the protection of persons at the time of recharging the vehicle, whilst coupling in series allows the vehicle's motor to be charged under a higher voltage and with lower current.

The coupling means, for example, comprise a plurality of controlled switches T1 to T6 capable of switching between open and closed positions, as illustrated FIGS. 5*b* and 5*c*.

When the vehicle is in charging position, the controlled switches T1 and T2 are open and the controlled switches T3 to T6 are closed so that the storage means are connected in parallel (FIG. 5*b*).

When the vehicle is in travel position, the controlled switches T1, T2 are closed and switches T3 to T6 are open so that the storage means 42 are connected in series (FIG. 5*c*).

Coupling System

With reference to FIG. 6, an illustration is given of a variant of embodiment of the coupling system in which the plates 30*a*, 30*b* are mounted with degrees of freedom by pivoting about two horizontal axes A-A' and B-B'.

This allows the ensured flat contacting of the lower surfaces of the bars with the upper surfaces of the plates when the bars are applied to the plates, in particular to avoid electric arcs and/or overheating of the connection assembly on passing of current, in particular if this current is conveyed at a simple edge or point contact region.

Different means can allow these degrees of freedom of the plates of the coupling system. For example, in one embodiment, each plate 30*a*, 30*b* is mounted on a swivel-joint so as to allow its mobility by pivoting as illustrated FIG. 2.

Figure 7:
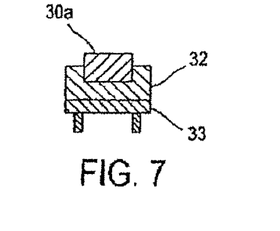

In another embodiment illustrated FIG. 7, each plate 30*a*, 30*b* is mounted on a rubber block 32 imparting sufficient mobility to ensure proper aligning of the upper and lower surfaces of the plate 30*a*, 30*b* and respective bar 10*a*, 10*b* when being contacted. This rubber block is mounted on a support 33 fixed to the ground.

Evidently, the bars 10*a*, 10*b* may also be mounted on the vehicle with suitable degrees of freedom.

Figure 2B:
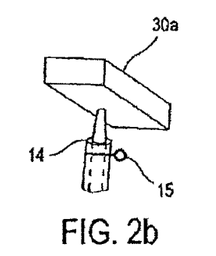

Advantageously, the coupling system may comprise means 22 to adapt the height of the plates in relation to the type of vehicle. Said adjustment means are illustrated FIG. 2*b*. For example, they may comprise a telescopic arm 14 associated with a locking pin 15 to lock the plates 30*a*, 30*b* at a determined height.

Figure 8:
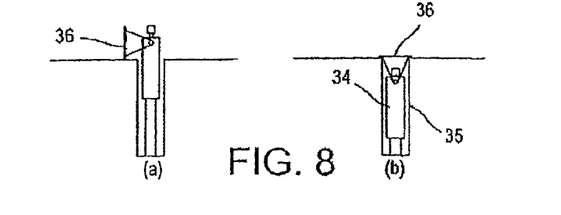

In another embodiment illustrated FIG. 8 the coupling system comprises means 34 capable of shifting the plates 30*a*, 30*b* between a retracted position (FIG. 8*b*) and a position released from the ground (FIG. 8*a*).

When the vehicle is positioned above the plates 30*a*, 30*b* these are brought to the released position. They are again retracted when charging is completed, to free the vehicle.

The shifting means 34 comprise linear actuators for example, such as cylinders operating between the ground 31 and the respective plate 30*a*, 30*b* or a plate support.

Preferably, the fixed part of the linear actuator—for example the cylinder body—is housed in a recess 35 made in the ground. The mobile part of the actuator—for example the cylinder piston—is capable of emerging from the recess to deploy the respective plate 30*a* or 30*b*.

A protection element 36 pivot-mounted on the cylinder piston can be associated with each plate 30*a*, 30*b*. This protection element 36 allows covering of the recess 35 in which the cylinder is housed when the plates 30*a*, 30*b* are retracted, for hazard prevention. In addition, to a certain extent, this protection element 36 provides blocking of the access to the plates 30*a*, 30*b* when the vehicle is being charged to avoid risks of electrocution.

In another embodiment illustrated FIGS. 8'*a* to 8'*c*, each protection element is pivot-mounted at ground level 31 and is capable of moving between a horizontal position (when there is no vehicle) and a vertical position (when a vehicle is being charged above the plates) to limit access to the connection assembly at the time of charging.

The coupling system comprises a support 38 comprising side walls 381 to 384 and a bottom part 385. The support 38 can be placed in a recess made in the ground 31. The side walls 381 to 384 of the support 38, at their ends opposite the bottom part, comprise a collar 386 extending outwardly and perpendicular thereto. This ensures that the support 38 is flush with the ground irrespective of the depth of the recess 35.

The coupling system comprises a linear actuator comprising a fixed part and a mobile part. The linear actuator is a cylinder for example including a cylinder body 391 fixed to the bottom 385 of the support 38, and a cylinder piston 392 inside the cylinder body 391. An electric pump 393 is fixed to the bottom of the support and connected to the cylinder body 392 to power the cylinder.

The plate 30*a*, 30*b* is connected to the end of the cylinder piston 392 via a flexible coupling element 395 to enable the plate 30a to pivot about at least one axis. In one variant, the plate 30a can be connected to the cylinder piston 392 by bearings.

One 383 of the side walls, at its end opposite the bottom 385, comprises a metal square 387 projecting towards the inside of the support 38. This metal square 387 acts as baseplate for a hinge 361 of the protection element 36.

The protection element 36 is connected to the cylinder piston 392 via rods 394 extending between the free end of the protection element 36 and the end of the cylinder piston 392 carrying the plate 30a. This allows the setting in movement of the protection element 36 by the cylinder piston 392. Therefore the movements of the plate 30a and of the protection element 36 are synchronized. Evidently, as a variant, the protection element 36 can be connected to individual drive means such as a motor.

Advantageously, the connection system may comprise mobile side protection panels 396 inside the support 38. In the embodiment illustrated FIGS. 8'a to 8'c, the device comprises three mobile side protection panels which come to lie opposite the three side walls 381, 382, 384 of the support 38 not comprising the hinge 361. These mobile side protection panels 396 can prevent the falling of objects (gravel, detritus, etc.) into the support 38 when the plates are not in the retracted position, for example during the deployment (respectively the retraction) of the cylinder piston to bring the plate to the released (respectively retracted) position.

The three mobile side protection panels 396 are connected to the plate 30a via rods 395. This allows the synchronized setting in movement of the plate 30a, of the protection element 36 and of the mobile side protection panels 396 via a single drive means formed by the cylinder piston 392 and powered by the electric pump 393. Evidently, as a variant, the mobile side protection panels 396 may be connected to individual drive means such as a motor.

The operating principle of the embodiment described in FIGS. 8'a to 8'c is the following. When the vehicle is positioned above the plates 30a, 30b, the cylinder piston 392 is deployed upwardly so as to bring the plates 30a, 30b to the released position (FIG. 8'c). The rods 394 connected between the cylinder piston 392 and the protection element 36 induce the movement of said protection element 36. This movement of the protection element 36 induces movement of the mobile side protection panels 396 via the rods 395 connected between the protection element 36 and the mobile side protection panels 396. The mobile side protection panels 396 slide upwardly along the side walls of the support in synchronous manner with the protection element 36.

When the charging of the vehicle is completed, the cylinder piston 392 is retracted downwardly so as to bring the plates 30a, 30b to the retracted position (FIG. 8'b). The movement of the cylinder piston 392 induces movement of the protection element 36 downwardly so as to close the support 38. The movement of the protection element 36 leads to setting in movement of the mobile side protection panels 396 which retract inside the support 38.

FIG. 8'd illustrates a variant of the embodiment shown FIGS. 8'a to 8'c, in which the connection system comprises two protection elements 36. In this variant, each protection element is connected to the cylinder piston via rods 394. Each protection element is pivot-mounted on a respective side wall 381, 383 of the support via a hinge 361. The device comprises two mobile side protection panels 396 arranged at the side walls 382, 384 of the support 38 not comprising the hinges.

In another variant illustrated FIGS. 8"a to 8"d each protection element 36 is pivot-mounted at the mobile anti-fall side protection panels 396. The connection system illustrated FIGS. 8"a to 8"d differs from the embodiment illustrated FIGS. 8'a to 8'c in that the means driving the mobile side protection panels 396 and the protection element 36 are different.

The device comprises four mobile side protection panels 396 on three of which a plateau 397 is fixed extending perpendicular to the mobile side protection panels 396. The plateau is positioned at the ends of the mobile side protection panels the furthest away from the bottom 385 of the support 38.

The plate 30a is fixed to the plateau 397 via a flexible coupling element 395.

The mobile side protection panels 396 are secured to the free end of the cylinder piston 392 via a horizontal bar 398 extending perpendicular to the mobile side protection panels. The horizontal bar 398 is fixed to the end of the cylinder piston 392 and in two of the four mobile side protection panels 396.

The protection element 36 has a cross-section of upturned L-shape. The protection element 36 comprises two walls 362, 363, one 362 (hereunder called "cover") being intended to cover the plate 30a when the system is in retracted position, and the other (hereunder called "partition") extending perpendicular to the cover and being intended to lie in the continuity of one 381 of the mobile side protection panels 396 when the system is in retracted position.

The protection element 36 is pivot-mounted on the mobile side protection panels 396 at a hinge 364 whose pin 365 is fixed in two opposite-facing mobile side protection panels.

The device also comprises elastic means 366—for example a spring—arranged around the hinge pin 365. One end 367 of the elastic means 366 bears upon the plateau 397 at a cut-out (not illustrated). The other end 368 of the elastic means 366 bears upon the partition 363.

The operating principle of the embodiment described in FIGS. 8"a to 8"d is the following.

When the vehicle is positioned above the plates 30a, 30b, the cylinder piston 392 is deployed so as to bring the plates 30a, 30b to the released position (FIG. 8'c). The mobile side protection panels 396, secured to the cylinder piston 392, move upwardly. The elastic means 366 exert a force on the partition 363 which tends to move the protection element 36 away from the plate 30a. The partition 363 comes to bear against the collar 386 of the support (FIG. 8"c). This allows the prevention of debris falling into the support 38. When the partition 363 is no longer in contact with the collar 386, the force exerted by the elastic means 366 moves the protection element 36 away so that the plate 30a is released (FIGS. 8" and 8"d).

When charging of the vehicle is completed, the cylinder piston 392 is retracted so as to bring the plates 30a, 30b into the retracted position (FIG. 8"b). The movement of the cylinder piston 392 induces movement of the mobile side protection panels 396. The partition 363 comes to bear against the edge of the collar 386 so as to counter the force exerted by the elastic means 366. As and when the mobile side protection panels 396 move downwardly, the protection element 36 draws close to the plate 30a until it covers this plate (FIG. 8"b).

As illustrated FIG. 9, the coupling system may also comprise detection means 73 similar to the detection means 63 previously described with reference to the connection system. These detection means 73 are integrated in the ground for example.

As described previously, each plate 30a, 30b is electrically connected to the charging device. In the embodiment illustrated FIG. 2, they are connected to the charging device via electric cables 23.

Figures 9, 10A:
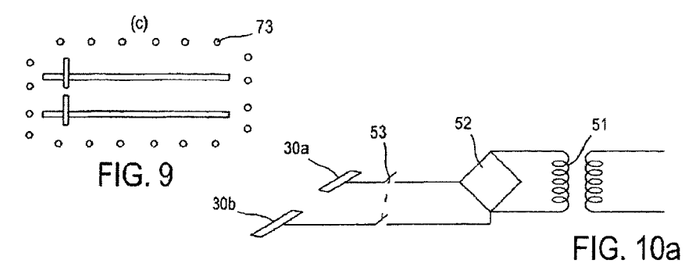
Figure 10B:
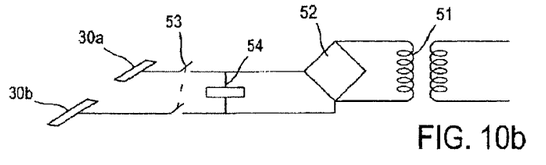
Figures 10C, 11B:
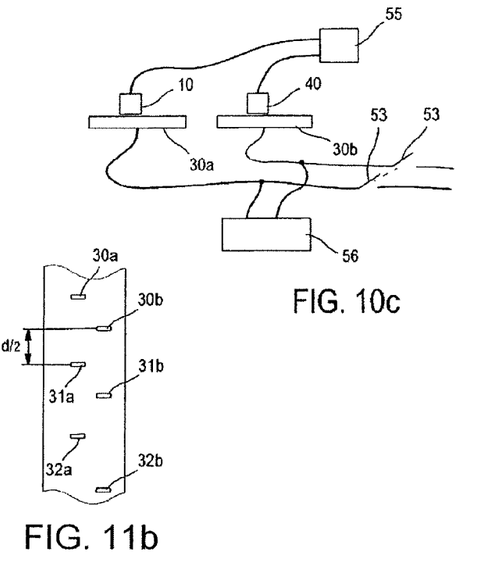

As illustrated FIGS. 10a to 10c, the charging device may comprise an isolating transformer 51 with floating potential comprising a primary coil and a secondary coil to increase the safety of the device.

The charging device also comprises a voltage rectifier 52 to convert alternating voltage derived from an electric network to direct voltage.

The charging device may also comprise disconnectors 53 allowing the mechanical separating of the plates 30a, 30b from the electricity network when the vehicle is not in charging position. This provides the ensured safety of persons moving in the vicinity of the plates 30a, 30b when there is no vehicle.

The charging device may also comprise an electric storage battery 54 to store electric energy and to transfer this energy when charging the vehicle storage means. When the vehicle is positioned above the plates 30a, 30b and the electrically conductive bars 10a, 10b come into contact with the plates 30a, 30b, the electric storage battery 54 transfers the accumulated electric energy.

This makes it possible, if needed, to recharge the storage means of the vehicle with an electric power that is higher than the power of the electric network (the case with super-capacitors in particular). When no vehicle is being charged, the electric storage battery 54 stores electric energy derived from the network. In one embodiment, the charging device comprises contact controlling and communication means, illustrated FIG. 10c under references 55 and 56.

These means are capable of analyzing the quality of contact between the bars 10a, 10b and the plates 30a, 30b, for example by measuring the impedance between the bars and the plates.

If the contact between the bars and plates is correctly set up, the control means command the powering up of the charging assembly. Conversely, if the contact between the bars and the plates is not correctly set up, the control means prohibit charging.

This prevents the charging assembly from being powered up when the necessary conditions are not met.

The communication means 55, 56 allow the transmission of data between the vehicle and the charging device when the vehicle's energy storage means are being charged. This data may comprise a vehicle identifier, the quantity of transferred energy or any other management data, for example to allow invoicing of the transferred energy.

According to another variant, the coupling system may comprise more than two electrically conductive plates 30a, 30b whose form and position may vary.

Figure 11A:
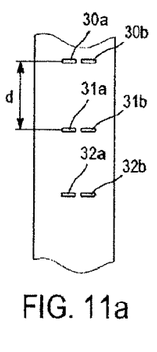

For example, the storage system may comprise six plates 30a, 30b, 31a, 31b, 32a, 32b whose major axes are arranged parallel to each other and which are aligned in two groups of three, as illustrated FIGS. 11a and 11b.

In the variant illustrated FIG. 11a, the plates are associated in pairs, each plate of one pair being intended to come into contact with a respective electrically conductive bar of the connection system. For each pair, the two plates may have one major merged axis as illustrated FIG. 11a, or they may be arranged staggered fashion as illustrated FIG. 11b.

By multiplying the number of plates, it is possible to charge the vehicle with higher electric power.

Connection Assembly

A more detailed description will now be given of different possible geometric arrangements for the connection assembly (essentially bars and plates) according to the invention.

In the embodiment illustrated FIG. 2, the distances between the bars of the connection system and the plates of the coupling system meet the following conditions.

Figure 12:
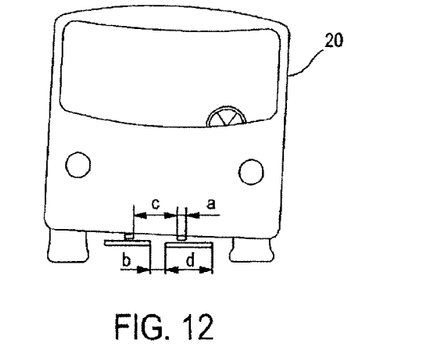
FIGS. 12 to 17 are schematic illustrations of embodiments of the connection assembly according to the invention.

As illustrated FIG. 12, the distance "b" between the electrically conductive plates 30a, 30b is preferably greater than the width "a" of a bar of the connection system. This prevents the mutual electric contacting of the two plates via a single bar which could cause a short circuit.

Also, the width "d" (transverse dimension in the direction of travel of the vehicle) of a plate 30a, 30b is shorter than the distance "c" between the bars 10a, 10b. This prevents two bars 10a, 10b from coming into contact with one same plate, which might risk causing a short circuit and possible deterioration of the vehicle's storage means.

Finally, the sum of the lengths of the plates is preferably chosen to be greater than the positioning margin of the vehicle. This allows an increase in the positioning tolerance of the vehicle relative to the plates located in the ground.

Figure 13:
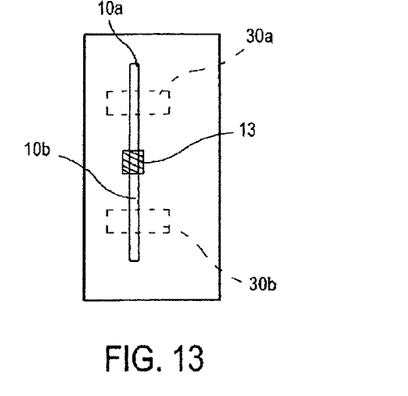

In one embodiment illustrated FIG. 13, the connection system comprises a single bar. This bar comprises two conductive bar segments 10a, 10b connected together by an insulating bar portion 13. Each bar segment 10a, 10b is electrically connected to a respective terminal of the storage means.

In this case, the coupling system is adapted to allow the contacting of each electrically conductive segment 10a, 10b with a respective plate 30a, 30b of the coupling system. In particular, in this embodiment the plates 30a, 30b of the coupling system are spaced apart in the direction of travel of the vehicle.

Figures 14A, 14B:
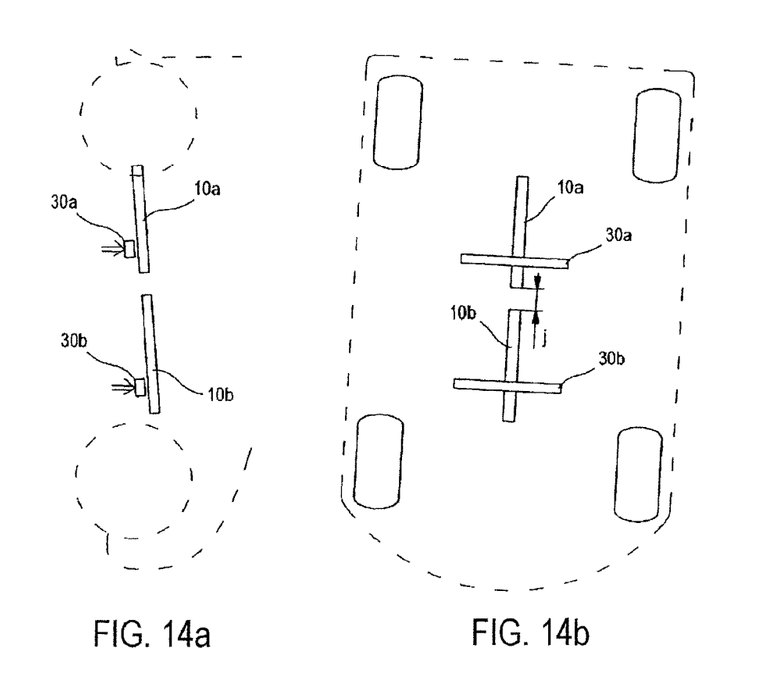

As a variant, and as illustrated in FIGS. 14a and 14b, the insulating portion can be replaced by a void space between the two bar segments 10a, 10b. In this embodiment, the two bar segments are aligned and separated by a distance j.

Evidently, the conductive bar may comprise more than two electrically conductive segments in relation to needs (control contact, need for two voltage levels, multiphase alternating power supply, etc.).

Figure 15:
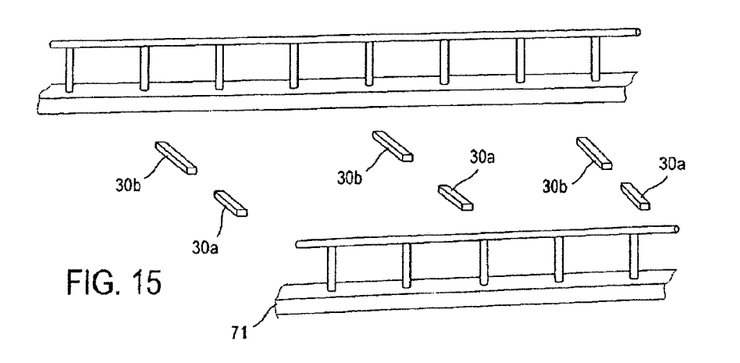

FIG. 15 illustrates an embodiment of the connection assembly according to the invention which is noteworthy in that it allows recharging when travelling, by driving the vehicle onto a protected "recharging" lane 71.

This lane has a succession of pairs of plates 30a, 30b supplied with electric current when a vehicle passes over them.

The plates are then either fixed (close to the surface of the ground) or mobile rising above the ground on passing of the vehicle.

The commanding of power supply to the plates and their possible rising movement are synchronized with movement of the vehicle, which can be detected using any suitable technology, in particular optical, magnetic, radio controlled, etc.

In said embodiment, the width of the plates across the lane is chosen so that contact is ensured with the corresponding conductive bar even if the vehicle deviates from the ideal trajectory in the centre of the lane.

Figure 16:
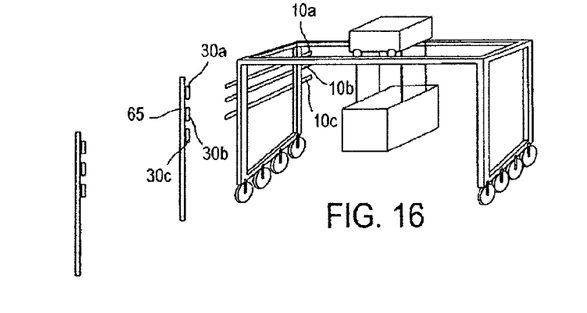

In another embodiment illustrated FIG. 16, the bars of the connection system can be fixed to the sides of the vehicle. This is suitable if the vehicle is a high vehicle e.g. an overhead crane of a port installation for container vessels. The plates 30a, 30b, 30c of the coupling system are then arranged vertically on side pillars 65. The side bars of the vehicle are intended to come into contact with the plates 30a, 30b, 30c of a pillar 65 to recharge the storage means of the trolley. This embodiment allows large tolerance with respect to the height positioning of the bars on the sides of the trolley, determined in particular by the height of the plates.

It will be noted that the trolley here comprises three conductive bars 10a, 10b, 10c intended to come into contact with three respective plates 30a, 30b, 30c of the coupling system. This allows three-phase electric charging of the vehicle for example, or the use of two different direct voltages for charging.

The foregoing description has generally described the connection system and the coupling system with reference to recharging when the vehicle is stationary.

It was also seen, as a variant, that the connection system and the coupling system according to the invention can be used to recharge a moving vehicle. It will be noted that the connection system and the coupling system can also be adapted for the continuous charging of a vehicle (whether or not comprising electric energy storage means).

In this variant, and again with reference to FIG. 15, the connection system on the vehicle side therefore comprises at least one electrically conductive bar positioned in the direction of the length of the vehicle, and the coupling system comprises a plurality of electrically conductive plates along the travel path, preferably positioned in the direction of the width of the vehicle.

The height-wise positioning of the bars and plates can be ensured by means causing the bar to bear upon the plate. These bearing means are the vehicle's suspension for example, ensuring that all the vehicles have the same distance between the bars and the ground under normal attitude conditions.

In addition or alternatively, means may be provided to obtain the bearing of each bar upon the associated plates, such bearing being achieved for example by means of an elastic force (at the bars and/or plates) or by means of magnetization between each bar and the plates.

The lower side of each bar and the upper side of the each plate are made in materials capable of rubbing against each other without compromising quality of contact and without causing excessive wear.

As has also been seen, the plates 30a, 30b are arranged in pairs, and two successive pairs of plates are preferably separated by a distance shorter than the length of a bar 10a, 10b to ensure that the vehicle's connection system is always in electric contact with at least one pair of plates.

The commanded powering of the pairs of plates is preferably such that the charging voltage is only applied to a pair of plates when the pair is completely covered by the vehicle. The current is supplied via by boxes embedded in the ground for example along the charging lane.

Advantageously, a brush can be arranged at the front end (or at both ends) of the vehicle. This brush is used to brush away any debris which may have accumulated on the plates.

Figure 17:
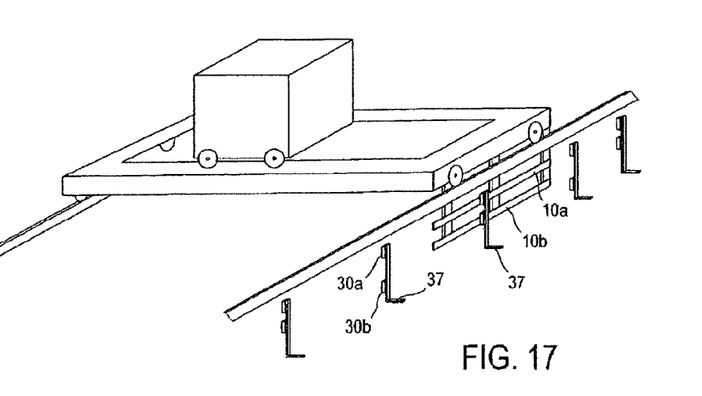

With reference to FIG. 17, another embodiment is illustrated of the connection system and coupling system according to the invention, here again adapted for the continuous charging of an overhead crane.

In this embodiment, the connection system comprises two electrically conductive bars 10a, 10b arranged on one side of the overhead crane. The coupling system comprises a plurality of plates. The plates are arranged in pairs along the pathway of the overhead crane. Each pair of plates is fixed to a support 37. The plates of the coupling system are intended to come into contact with the bars of the connection system to allow the supplying of electricity to the overhead crane. The supports are spaced apart by a horizontal distance shorter than the length of a bar 10a, 10b of the connection system. This can ensure that the bars 10a, 10b of the overhead crane are at all times in contact with at least one pair of plates of the coupling system. Each pair of plates is supplied with electric current when the bars of the overhead crane are in contact therewith. The commanding of the supply of electric current to the pairs of plates can be ensured using any detection system known to persons skilled in the art for detecting the position of the overhead crane.

Numerous modifications can be made to the present invention. For example, the coupling system may comprise a single mechanical unit incorporating the two (or more) conductive plates, and an insulating element separating the plates so as to define two separate conductive portions, each portion being electrically connected to a terminal of an electric supply source.

The invention claimed is:

1. Electrical coupling system for coupling an electrical charging device with energy storage means of an electric drive vehicle, wherein the electrical coupling system comprises a support which can be positioned in a recess made in the ground, at least two electrically conductive plates in the support, the plates able to be electrically connected to a charging device, shifting means capable of shifting the plates between a retracted position and a position released from the ground, and at least one protection element intended to cover the recess in which the support is positioned when the plates are retracted, wherein the electrical coupling system further comprises mobile side protection panels arranged to prevent objects from falling into the support, the mobile side protection panels being connected to the protection element via rods so that the movements of the protection element and of the mobile side protection panels are synchronous.

2. The system according to claim 1, further comprising means for driving each plate, said means for driving each plate comprising at least one linear actuator comprising a fixed part and a mobile part.

3. The system according to claim 2 wherein the protection element is pivot-mounted on the mobile part of the actuator.

4. The system according to claim 1, wherein the protection element is connected to the mobile part of the actuator via rods.

5. The system according to claim 1, wherein the protection element is pivot-mounted on the mobile side protection panels.

6. The system according to claim 5, further comprising elastic means between the protection element and the mobile side protection panels, said elastic means exerting a force on a partition of the protection element which tends to move the protection element away from the plate.

7. The system according to claim 1, further comprising mobile side protection panels arranged to prevent objects from falling into the support, the movements of the protection element and of the mobile side protection panels being synchronous, and wherein the means for driving each plate comprise at least one linear actuator comprising a fixed part and a mobile part, and wherein the mobile side protection panels are secured to the end of the mobile part of the actuator.

8. The system according to claim 1, wherein the plates are elongate and their major axes are arranged parallel to each other.

9. The system according to claim 1, wherein the plates are laterally offset from one another.

10. The system according to claim 1, wherein the plates have merging major axes.

11. The system according to claim 1, wherein the plates are mobile by pivoting about at least one horizontal axis.

12. The system according to claim 11 further comprising means for detecting the presence of a vehicle above the plates.

13. An installation for recharging electric drive vehicles, comprising a vehicle parking area provided with a plurality of coupling systems for coupling an electrical charging device with energy storage means of an electric drive vehicle, wherein the electrical coupling system comprises a support which can be positioned in a recess made in the ground, at least two electrically conductive plates in the support, the plates able to be electrically connected to a charging device, shifting means capable of shifting the plates between a retracted position and a position released from the ground, and at least one protection element intended to cover the recess in which the support is positioned when the plate are retracted, wherein the electrical coupling system further comprises mobile side protection panels arranged to prevent objects from falling into the support, the mobile side protection panels being connected to the protection element via rods so that the movements of the protection element and of the mobile side protection panels are synchronous.

14. The installation according to claim 13, further comprising means for driving each plate, said means for driving each plate comprising at least one linear actuator comprising a fixed part and a mobile part.

15. The installation according to claim 13, wherein the protection element is connected to the mobile part of the actuator via rods.

16. The installation according to claim 13, wherein the protection element is pivot-mounted on the mobile side protection panels.

17. The installation according to claim 16 further comprising elastic means between the protection element and the mobile side protection panels, said elastic means exerting a force on a partition of the protection element which tends to move the protection element away from the plate.

18. The installation according to claim 14 wherein the protection element is pivot-mounted on the mobile part of the actuator.

19. The installation according to claim 13, further comprising mobile side protection panels arranged to prevent objects from falling into the support, the movements of the protection element and of the mobile side protection panels being synchronous, and wherein the means for driving each plate comprise at least one linear actuator comprising a fixed part and a mobile part, and wherein the mobile side protection panels are secured to the end of the mobile part of the actuator.

20. The installation according to claim 13, wherein the plates are elongate and their major axes are arranged parallel to each other.

21. The installation according to claim 13, wherein the plates are laterally offset from one another.

22. The installation according to claim 13, wherein the plates have merging major axes.

23. The installation according to claim 13, wherein the plates are mobile by pivoting about at least one horizontal axis.

24. The installation according to claim 23, which further comprises means for detecting the presence of a vehicle above the plates.

* * * * *